United States Patent Office 3,521,718
Patented July 28, 1970

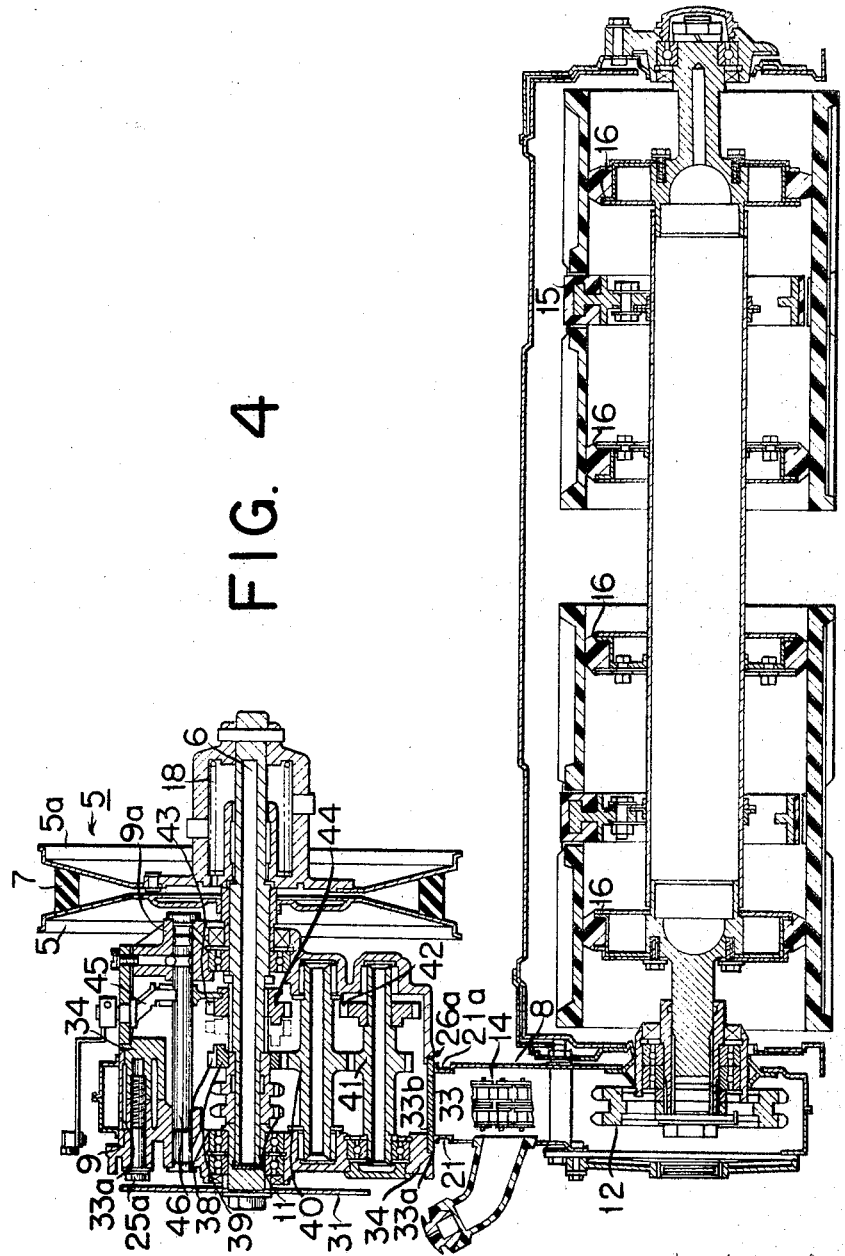

3,521,718
TRANSMISSION DEVICE OF AN ENDLESS-TRACK VEHICLE
Yutaka Masaoka and Fujihiko Tomita, Shizuoka-ken, Japan, assignors to Yamaha Hatsudoki Kabushiki Kaisha, Shizuoka-ken, Japan, a corporation of Japan
Filed Nov. 6, 1968, Ser. No. 773,762
Claims priority, application Japan, Nov. 8, 1967, 42/94,173; July 27, 1968, 43/52,881
Int. Cl. B62m 9/16; B62d 55/12
U.S. Cl. 180—9.64        7 Claims

ABSTRACT OF THE DISCLOSURE

The present transmission device of an endless-track vehicle involves a box-shaped chain housing covering a driving sprocket, a driven sprocket and an endless chain stretched across said sprockets. On both sides of the upper portion of said chain housing are disposed a pair of opposed brackets so as to carry a counter axle supporting said driving sprocket. Said device further includes means for adjustably setting said brackets relative to said chain housing so that the distance between the axles of said sprockets may be varied.

BACKGROUND OF THE INVENTION

This invention relates to transmission devices of endless-track vehicles capable of automatically changing the speed of said vehicle, and more particularly to a transmission device having improved means supporting a counter axle positioned in the upper portion of a chain housing. Such type of said endless-track vehicle is utilized mainly for travel over snow.

The prior art transmission device was provided with a sheave drive for transmitting power at varying speeds consisting of a driving sheave connected to the engine shaft, a driven sheave connected to a counter axle, and an endless V-shaped transmission belt stretched across said sheaves. Each of said sheaves has a first member fixed to the axle and a second member movable to the axle in the axial direction.

Said transmission device further involved a support member for firmly carrying said counter axle of said driven sheave in place.

Furthermore, said device was separately provided with a driving sprocket coaxially connected to said driven sheave, a driven sprocket secured to a front shaft for driving an endless track, an endless chain stretched across said sprockets, and a chain housing covering said sprockets and endless chain, said chain housing being secured to the vehicle body.

Said support member was mounted on the upper portion of said chain housing built up on the vehicle body or mounted on the vehicle body separately from said chain housing, so as generally to carry said driving sprocket only on one side. Such supporting construction was not sufficiently strong and rigid to endure the torsion stress generated due to the power transmitted through the counter axle. Furthermore, said transmission device was often of complicated and wasteful construction.

SUMMARY OF THE INVENTION

An object of this invention is to provide a transmission device of an endless-track vehicle involving a driving sprocket secured to a counter axle, a speed-changing drive means to transmit the power of the engine of said endless-track vehicle, a driven sprocket secured to a front shaft for driving an endless track, an endless chain stretched across said sprockets, a box-shaped chain housing covering said sprockets and endless chain, a pair of brackets disposed on the opposed sides of the upper portion of said chain housing so as rotatably to carry the counter axle supporting said driving sprocket on its both sides, and means for adjustably setting said brackets relative to said chain housing so that the distance between the axles of said sprockets may be varied.

Accordingly, since the chain housing has a closed cross-section and the brackets for carrying the counter axle are mounted on both side walls of said chain housing so as to carry the driving sprocket on both sides, the construction of the present transmission device is sufficiently strong and rigid to endure the torsion stress generated due to the power transmitted through the counter axle. Moreover, the simple and economical construction of said transmission device is accomplished by securing the brackets directly to the chain housing.

BRIEF EXPLANATION OF THE DRAWINGS

FIG. 4 is a vertical cross-sectional view of a transmission device according to another embodiment of this invention, taken along the same line as in FIG. 1, in which the cross-section of the gear changing mechanism is indicated along line IV—IV of FIG. 5.

DETAILED DESCRIPTION OF THE INVENTION

Figure 1:
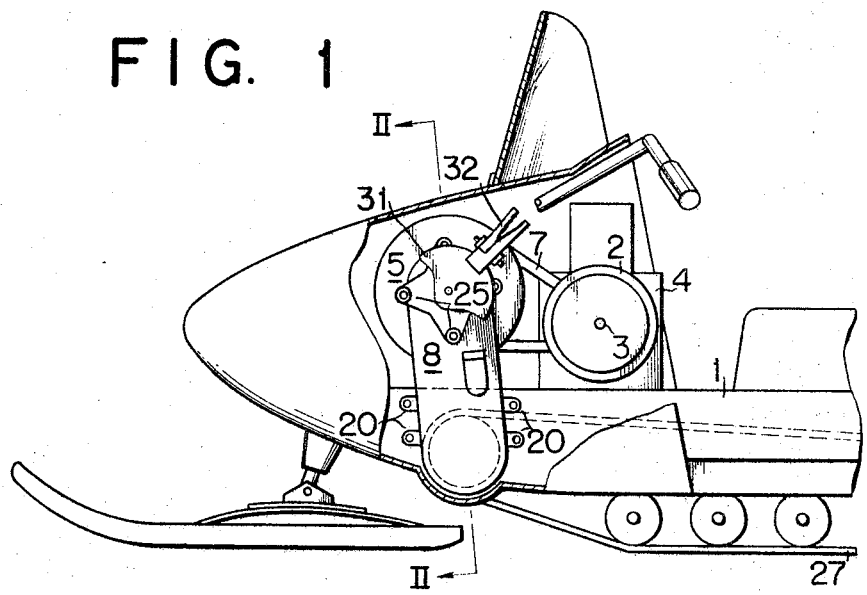
FIG. 1 is a side view of an endless-track vehicle having a transmission device embodying this invention.
Figure 2:
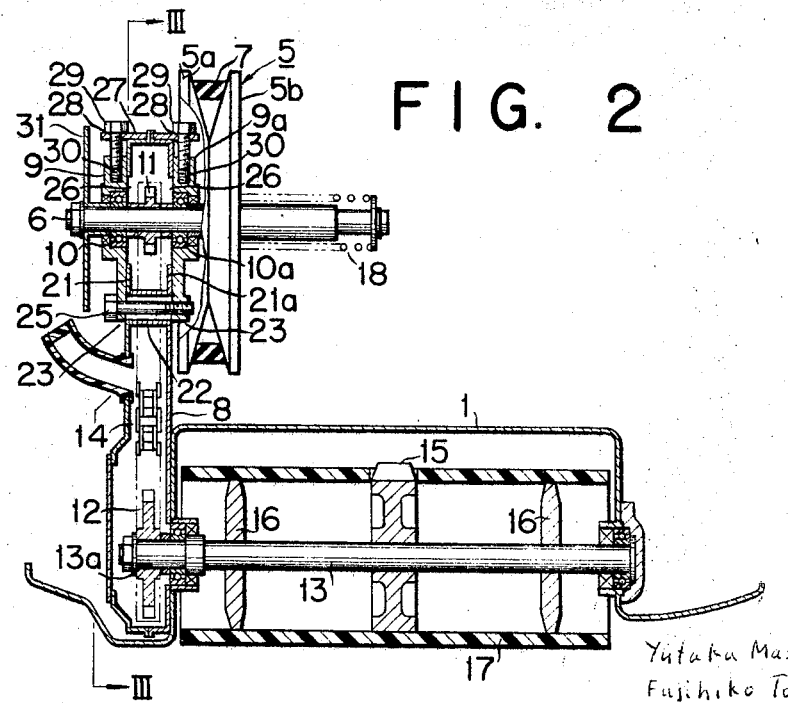
FIG. 2 is a cross-sectional view of said transmission device taken along line II—II of FIG. 1.
Figure 3:
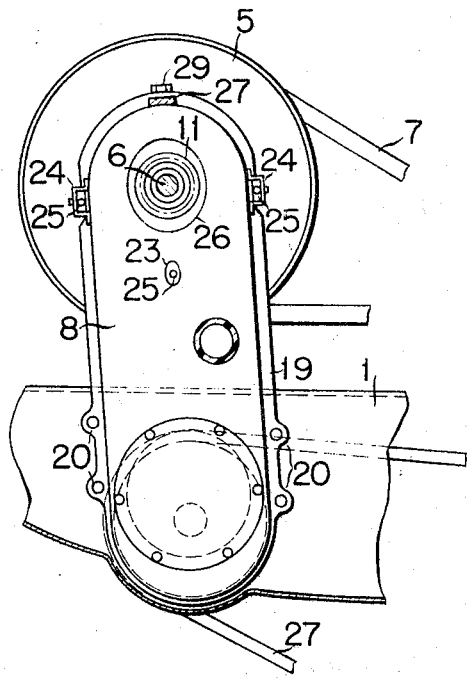
FIG. 3 is an elongated side view of said transmission device taken along line III—III of FIG. 2, with a part broken away.

A transmission device illustrated in FIGS. 1 to 3 is mounted on the forward portion of an endless-track vehicle body or frame 1. Said transmission device consists of a sheave drive for transmitting power at variable speeds and a chain transmission drive. Said sheave drive consists of a driving sheave 2 secured to the power take-off shaft 3 of an engine 4 disposed on the vehicle frame 1, a driven sheave 5 secured to a counter axle 6, and a V-shaped transmission belt 7 stretched across said sheaves 2 and 5. Said chain transmission device comprises a vertically extending box-shaped chain housing 8 secured to the side of the vehicle frame 1, a pair of brackets 9 and 9a disposed on the upper portion of said chain housing 8, a pair of bearings 10 and 10a nested in said brackets respectively, a driving sprocket 11 positioned in the upper portion of said chain housing 8 and supported by the counter axle 6 carried by said bearings, a driven sprocket 12 secured to an end portion 13a of a front shaft 13 projected into said chain housing 8, and an endless chain 14 interlockingly stretched across said sprockets. A toothed wheel 15 is fixed to the middle portion of said front shaft 13, and two guide wheels 16 to the portions near the ends. Said driven sprocket 12 causes an endless track 17 to be driven. Said endless track 17 is interlocked with said toothed wheel 15 and stretched across said toothed wheel 15 and a driven wheel (not shown), as well as across said guide wheels 16 and rear-positioned guide wheels (not shown).

Said driven sheave 5 constitutes one of main parts of the variable speed-sheave drive as generally called. Said driven sheave is fabricated by a pair of conically shaped members 5a and 5b, the first member 5a being fixedly secured to the counter axle 6 and the second member 5b being secured to the counter axle 6 movably in an axial direction. The mutually facing conical surfaces of said members are urged to each other by means of a spring member 18. Said movable member 5b is automatically moved away from said fixed member 5a against the resistance of said spring member 18 due to the increased engine speed or the reduction of resistance applied to the running endless-track vehicle, with the result that the reduction ratio of said transmission device is continuously decreased.

Said chain housing 8 has a closed cross-section so as to cover the sprockets and endless chain entirely. Since the chain housing 8 has said closed cross-section and the brackets 9 and 9a for carrying the counter axle 6 are mounted on both side walls of said chain housing, the construction of the present transmission device is sufficiently strong and rigid to endure the torsion stress generated due to the power transmitted through the counter axle.

Formed on the periphery of said chain housing 8 is a flange or web 19, at the lower portion of which said chain housing 8 is fixedly secured to the side of the vehicle body 1 by means of locking bolts 20. The opposed side walls 21 and 21a of the upper portion of said chain housing 8 are mutually fixed by a cylindrical member 22 whose interior communicates with an idle bore 23 drilled or formed in each of said walls 21 and 21a. Said chain housing 8 has two substantially channel-shaped members 24 respectively.

Said brackets 9 and 9a are fixed to the upper portion of said chain housing 8 by screwing locking or clamping bolts 25 loosely through said idle holes 23 and channels 24 in a manner to sandwich said chain housing.

The upper portion of said chain housing 8 has openings 26 formed in said opposed side walls 21 and 21a. The diameter of said openings 26 is larger than that of the driving sprocket 11 to be inserted into the chain housing 8 through one of said openings 26.

Welded on the top of said chain housing 8 is a stay 27 having through bores 28, through which adjusting bolts 29 are vertically screwed into threaded bores 30 formed in the top of the brackets 9 and 9a.

Where it is desired to vary the distance between the axles of said sprockets 11 and 12, the brackets 9 and 9a are first released from the conditions where they are rigidly secured to the chain housing by slightly unscrewing said locking bolts 25, secondly moved in a vertical direction relative to said chain housing by rotating said adjusting bolts 29, and finally rigidly secured again by screwing said locking bolts 25 to the chain housing at a new position defined by the adjustment of said bolts 29.

At the end of the axle 6 opposite to the other end at which the driving sheave is positioned is located a brake disk 31 as shown in FIGS. 1 and 2, said disk 31 being coupled with brake shoe calipers 32 mounted on the bracket 9. Said calipers 32 are operated by means well known.

Consequently, when compared with the prior art, the transmission device embodying this invention has a strong and rigid construction as aforementioned and is more simply fabricated so as to eliminate waste materials. This is important from the standpoint of best design.

Furthermore, the distance between the axles of said sprockets 11 and 12 can be easily varied merely by adjustment of the position of said brackets relative to said chain housing with the aid of operations of said locking bolts 25 and adjusting bolts 29, because the counter axle 6 of the sprocket 11 is supported only by the bearings 10 and 10a nested in said brackets and free from connection with any other support members.

Figure 5:
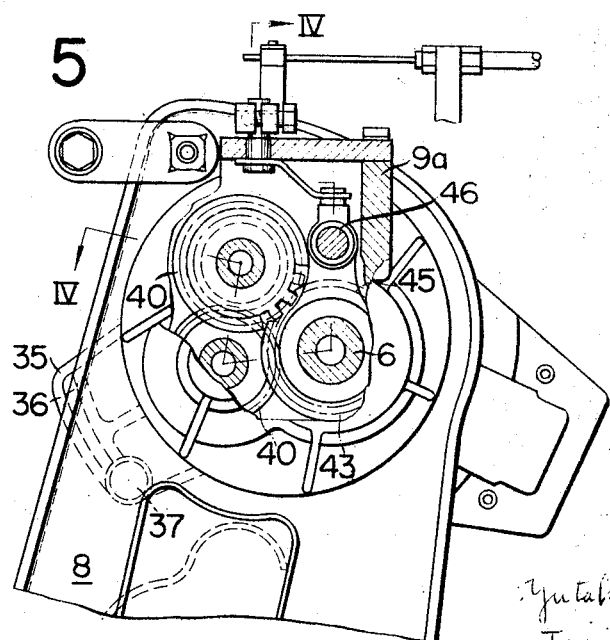
FIG. 5 is a side view of the upper portion of said transmission device of FIG. 4, with a part broken away.

The transmission device illustrated in FIGS. 4 and 5 is different from that disclosed in the above-mentioned embodiment in that the upper portion of a chain housing contains a gear changing mechanism and brackets nesting bearings are rotatable around an axis defined on the upper portion of said chain housing. However, in respect of the other parts, said transmission device is substantially similar to the first-mentioned device. Therefore, the same parts of the transmission device of FIGS. 4 and 5 as those of FIGS. 1 to 3 will hereinafter be represented by the same numerals for avoiding the complex and redundant description.

As shown in FIGS. 4 and 5, the upper portion of said chain housing 8 had two circular openings 26a formed in the side walls 21 and 21a respectively. A short cylindrical member 33 having an opening 33b at the lower portion thereof which is adapted to pass through the endless chain 14 is rigidly fitted into said circular openings 26a so as to bridge the intervening space between said side walls 21 and 21a.

The respective brackets 9 and 9a have a cylindrical inside part 34 to be fitted into the bore 33a of the cylindrical member 33, and more particularly the bracket 9a is shaped into a cap so as substantially to elongate the inerior of the upper portion of the chain housing in a sidewise direction.

As described above, said brackets 9 and 9a are rotatable around the axis of the bore 33a, which is defined eccentrically to the counter axle 6 of the driving sprocket 11. The bracket 9 has a guide member 35 provided with a groove 36 whose central line is arranged coaxial with the cylindrical inside part 34. A locking bolt 37 is inserted into the groove 36 and screwed in the side wall 21. Therefore, when the brackets are rotated around the axis of said cylinder bore 33a the locking bolt 37 will slide along said groove 36. Said brackets 9 and 9a are secured to the chain housing 8 by screwing locking bolts 25a and 37, in the same manner as in the first embodiment.

The gear changing mechanism contained in the upper portion of said chain housing 8 is of a generally known type. Namely, said mechanism consists of a driving gear 38 coaxially connected to the driving sprocket 11 which, in this embodiment, is rotatably secured to the counter axle 6, clutch claws 39 integrally formed on the side of said driving gear 38, two gears 40 and 41 respectively journalled in a direction parallel to the axle 6 by being supported by said brackets and interlocked with each other, a back gear 42 fixed to the journal of the gear 41, and a reverse gear 43 splined to the counter axle 6 and having clutch claws 44 to be removably engaged with said clutch claws 39. The driving gear 38 is interlocked with the gear 40, and the reverse gear 43 is engaged alternatively to the driving gear 38 and the back gear 42.

Consequently, when the reverse gear 43 is engaged with the driving gear 38 the sprocket 11 will be rotated in a direction similar to that of the counter axle 6. In contrast, when the reverse gear 43 is engaged with the back gear 42 the sprocket 11 will be rotated in a reverse direction. Such actuation of the gear changing mechanism has been well known.

In the latter embodiment, since the gear changing mechanism is conveniently contained in the upper portion of the chain housing, as compared with the prior art, the transmission device is very compact in spite of the excessive construction caused by the gear change mechanism.

The guide of the reverse gear 43 may be accomplished by means of a change lever 45 travelling along the horizontal beam 46 bridging the intervening space between the brackets.

What is claimed is:

1. A transmission device of an endless-track vehicle comprising; a box-shaped chain housing (8) secured to a body of said endless-track vehicle at the lower portion thereof and upwardly raised thereon; two opposed brackets disposed on the both sides of the upper portion of said chain housing means for releasably setting said brackets relative to said chain housing, a counter axle rotatably carried by said brackets; a front shaft for transmitting power so as to drive at least one endless track, said front shaft being supported by the vehicle body and having an end portion projected into said lower portion of said chain housing; a driving sprocket secured to said counter axle and positioned in said upper portion of said chain housing; a driven sprocket secured to said end portion of said front shaft; and an endless chain stretched across said sprockets, the output power of the engine of said endless-track vehicle being transmitted to said counter axle by a speed-changing drive means.

2. A transmission device of an endless-track vehicle claimed in claim 1 in which said speed-changing drive means includes a driven sheave secured to said counter axle, a driving sheave secured to the power output shaft of an engine and a V-shaped transmission belt stretched across said driving and driven sheaves, said sheaves and V-shaped transmission belt constituting a speed-varying sheave drive.

3. A transmission device of an endless-track vehicle claimed in claim 1 in which there are provided a pair of bearings nested in said brackets, and said brackets are fixed to the chain housing in a manner to sandwich the upper portion of said chain housing.

4. A transmission device of an endless-track vehicle claimed in claim 1 in which there are provided a pair of bearings nested in said brackets, and said brackets are rotatable around the axis defined on the upper portion of said chain housing eccentrically to the counter axle.

5. A transmission device of an endless-track vehicle claimed in claim 3 in which setting means consists of locking bolts adapted to secure the brackets to the upper portion of said chain housing and adjusting bolts adapted to move the brackets to the upper portion in the direction which enables the distance between the axles of said sprockets to be varied.

6. A transmission device of an endless-track vehicle claimed in claim 3 in which setting means consists of locking bolts adapted to secure the brackets to the upper portion of said chain housing, a cylindrical member bridging the intervening space between both sides of said upper portion, and a circular fitting portion formed on the brackets respectively, said portion being rotatable around the central axis of said cylindrical member, which is disposed eccentrically to the counter axle.

7. A transmission device of an endless-track vehicle claimed in claim 1 in which the upper portion of said chain housing contains a gear changing mechanism supported by said brackets.

References Cited
UNITED STATES PATENTS

| | | | |
|---|---|---|---|
| 1,094,140 | 4/1914 | Franquist | 74—242.14 X |
| 3,023,824 | 3/1962 | Bombardier | 180—9.64 |
| 2,776,018 | 1/1957 | Lundquist | 180—9.64 |

RICHARD J. JOHNSON, Primary Examiner

U.S. Cl. X.R.

74—242.14; 180—5, 70